United States Patent
Chen et al.

(10) Patent No.: US 11,618,689 B2
(45) Date of Patent: Apr. 4, 2023

(54) PREPARATION OF COPPER(II)-AMMONIA COMPLEX ION SULFIDIZATION ACTIVATOR AND SULFIDIZATION FLOTATION METHOD FOR COPPER OXIDE ORE

(71) Applicants: HUNAN RESEARCH INSTITUTE FOR NONFERROUS METALS, Hunan (CN); Central South University, Hunan (CN)

(72) Inventors: Daixiong Chen, Hunan (CN); Chenyang Zhang, Hunan (CN); Wei Sun, Hunan (CN); Bo Hu, Hunan (CN); Jianyu Zhu, Hunan (CN); Mengfei Liu, Hunan (CN); Qiqi Zhou, Hunan (CN); Yanhong Dong, Hunan (CN)

(73) Assignees: HUNAN RESEARCH INSTITUTE FOR NONFERROUS METALS, Changsha (CN); Central South University, Changsha (CN)

( * ) Notice: Subject to any disclaimer, the term of this patent is extended or adjusted under 35 U.S.C. 154(b) by 309 days.

(21) Appl. No.: 16/984,079

(22) Filed: Aug. 3, 2020

(65) Prior Publication Data
US 2021/0039956 A1    Feb. 11, 2021

(30) Foreign Application Priority Data
Aug. 6, 2019  (CN) .......................... 201910719505.6

(51) Int. Cl.
| C01G 3/00 | (2006.01) |
| C01G 3/14 | (2006.01) |
| B03D 1/01 | (2006.01) |
| C01G 3/02 | (2006.01) |

(52) U.S. Cl.
CPC ................. C01G 3/14 (2013.01); B03D 1/01 (2013.01); C01G 3/02 (2013.01); B03D 2201/007 (2013.01); B03D 2203/04 (2013.01)

(58) Field of Classification Search
CPC .......... B03D 1/012; B03D 1/018; B03D 1/01; C01G 3/02; C01G 3/14
See application file for complete search history.

(56) References Cited

FOREIGN PATENT DOCUMENTS

| CN | 102211060 A | 10/2011 |
|----|-------------|---------|
| CN | 102688809 A | 9/2012 |
| CN | 103191833 A | 7/2013 |
| CN | 103894294 A | 7/2014 |
| CN | 105112675 A | 12/2015 |
| CN | 105452497 A | 3/2016 |
| CN | 105457760 A | 4/2016 |
| CN | 106824545 A | 6/2017 |
| CN | 105688910 B | 11/2017 |
| GB | 190926019 A | 12/1910 |
| KR | 101765897 B1 | 8/2017 |

*Primary Examiner* — Steven J Bos

(57) ABSTRACT

The disclosure relates to mineral processing, and more particularly to a copper(II)-ammonia complex ion sulfidization activator, and its preparation and application. A molar ratio of $NH_3$ to $Cu^{2+}$ in the active ingredient of the copper (II)-ammonia complex ion sulfidization activator is 2:1-4:1. The preparation method includes: dropwise adding an ammonia solution to a copper salt solution; and adjusting the mixture to pH 6-7.2 with dilute sulfuric acid to obtain the copper(II)-ammonia complex ion sulfidization activator. During the sulfidization flotation for the copper oxide ore, the copper(II)-ammonia complex ion sulfidization activator is added and mixed uniformly with the ore slurry prior to the introduction of the sulfidizing agent.

14 Claims, 1 Drawing Sheet

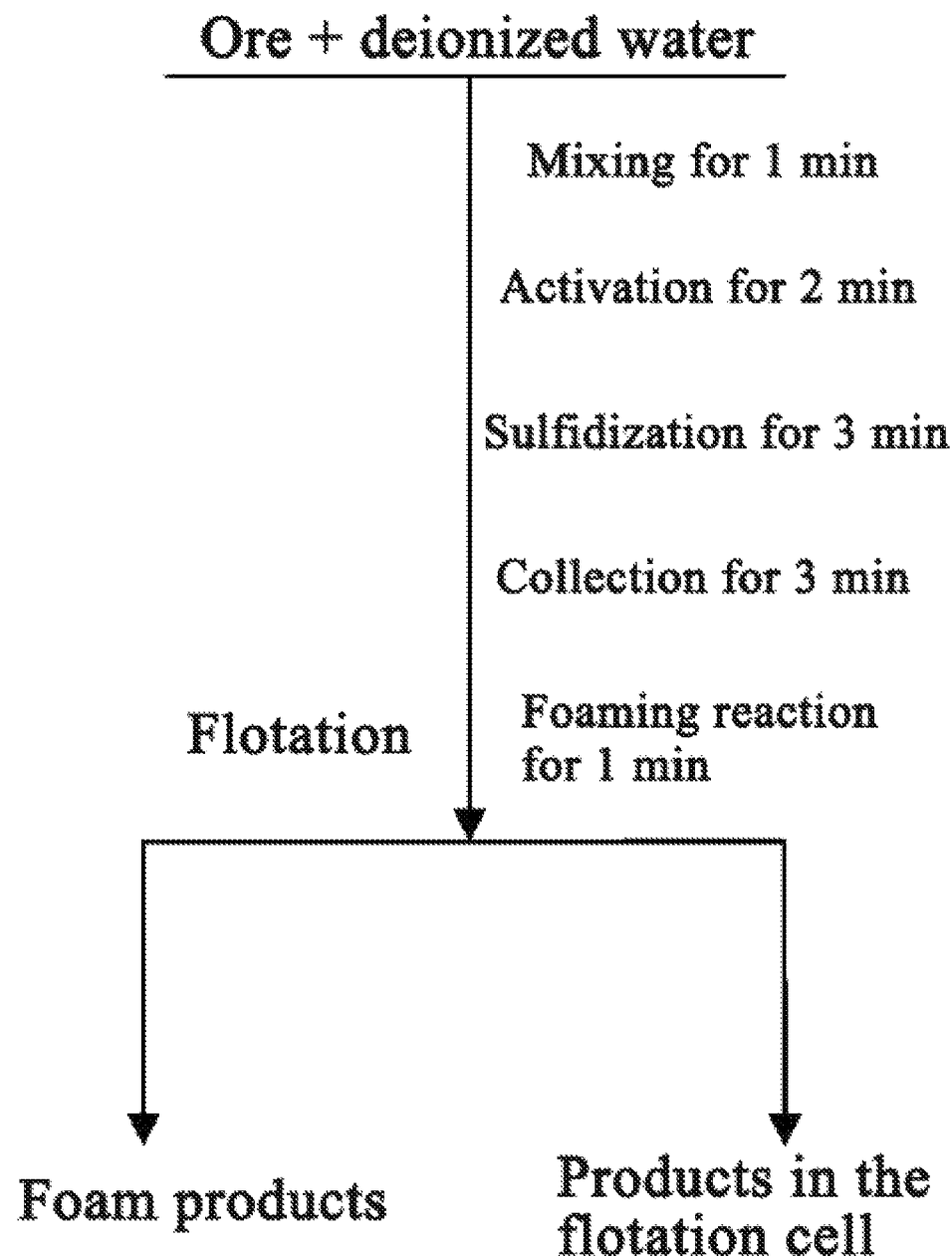

PREPARATION OF COPPER(II)-AMMONIA COMPLEX ION SULFIDIZATION ACTIVATOR AND SULFIDIZATION FLOTATION METHOD FOR COPPER OXIDE ORE

CROSS-REFERENCE TO RELATED APPLICATIONS

This application claims the benefit of priority from a Chinese Patent Application No. 201910719505.6, filed on Aug. 6, 2019. The content of the aforementioned application, including any intervening amendments thereto, is incorporated herein by reference in its entirety.

TECHNICAL FIELD

This disclosure relates to mineral processing, and more particularly to a copper(II)-ammonia complex ion sulfidization activator, and its preparation and application.

BACKGROUND

Copper oxide ore, predominated by malachite, is an important component of copper ore resources. In recent years, with the depletion of sulfide ore resources, the exploitation and utilization focus has been gradually shifted to the oxide ore resources. The processing of copper oxide ores mainly includes flotation and chemical mineral processing, where the flotation plays a dominant role in the recovery of copper oxide ores. The flotation of copper oxide ores generally includes direct flotation, sulfidization flotation, amine flotation and chelating agent-neutral oil flotation. At home and abroad, the theoretical study on the flotation of copper oxide ores has been a focus for a long time. Based on extensive theoretical and practical researches, the sulfidization flotation gradually stands out and has been widely used in the recovery of copper oxide ores.

During the existing sulfidization flotation process, a sulfidizing agent such as sodium sulfide and sodium hydrosulfide is employed to pre-sulfidize the copper oxide minerals, and then a xanthate collector is added for flotation. At present, most copper oxide ores have the characteristics of high oxidation rate, high binding rate, high mud content, low grade and oxygen-sulfur mixing, which greatly increase the difficulty in the flotation of copper oxide ores. Moreover, the sulfidization effect is directly associated with the flotation effect of copper oxide ores. After sodium sulfide is added to the slurry, a hydrophobic sulfide film is formed on the surface of the malachite mineral, which significantly enhances the mineral floatability. However, it has been found by electron microscope scanning that the sulfide film is very unstable due to the presence of a certain looseness, so that it is easy to fall off from the mineral surface to form a colloid during the intense stirring, which is not conducive to the flotation. In addition, the floating activity can only be maintained for a short time. For the flotation of the copper oxide minerals, the sulfidizing agent is not only an effective activator for the copper oxide minerals, but can also acts as an inhibitor for the copper sulfide minerals or sulfidized copper oxide minerals, so the dosage of the sulfidizing agent should be strictly limited. Therefore, it is highly required to introduce an activator to strengthen the sulfidizing flotation of copper oxide minerals. At present, the most commonly used activators for strengthening the sulfidization of copper oxide ores are ammonium sulfate and ethylenediamine phosphate. The research results show that though the ammonium sulfate can improve the recovery rate of free copper oxide in the slurry to a certain extent and promote the sulfidization, it still fails to provide satisfactory recovery effect of copper oxide minerals. The ethylenediamine phosphate can inhibit the flotation of the slime, and activate the sulfide ore contained in the slurry, but its activation effect is inferior to the ammonium sulfate, and the improvement in recovery rate is still unsatisfactory. Therefore, there is an urgent need to develop a novel activator for strengthening the sulfidizing flotation of copper oxide ores to overcome the defects in the current sulfidization activators.

SUMMARY

In view of this, a first object of this application is to provide a novel copper(II)-ammonia complex ion sulfidization activator to improve the flotation recovery rate of copper oxide ores and strengthen and promote the sulfidization.

A second object of the disclosure is to provide a preparation method of the above copper(II)-ammonia complex ion sulfidization activator.

A third object of the disclosure is to provide an application of the copper(II)-ammonia complex ion sulfidization activator.

The technical solutions of the disclosure are specifically described as follows.

In a first aspect, the disclosure provides a copper(II)-ammonia complex ion sulfidization activator, wherein a molar ratio of $NH_3$ to $Cu^{2+}$ in an effective component of the sulfidization activator is 2-4:1, preferably 2:1.

In a second aspect, the disclosure provides a method of preparing the copper(II)-ammonia complex ion sulfidization activator, comprising:

dropwise adding an ammonia solution to a copper salt solution to produce a mixture; and adjusting the mixture to pH 6-7.2 to produce the copper(II)-ammonia complex ion sulfidization activator, wherein a molar ratio of $Cu^{2+}$ to $NH_3$ in the mixture is 1:2-1:4.

In an embodiment, a rate of the dropwise adding of the ammonia solution to the copper salt solution is 0.5-2 drops/second.

In an embodiment, after the ammonia solution is dropwise added to the copper salt solution, the mixture is adjusted to pH 6.3 with dilute sulfuric acid.

In an embodiment, the copper salt solution is selected from the group consisting of copper sulfate solution, copper chloride solution, copper nitrate solution and a combination thereof; the ammonia solution is selected from the group consisting of ammonium sulfate solution, ammonium chloride solution, ammonium nitrate solution, ammonia water and a combination thereof.

In an embodiment, a concentration of the copper salt solution is 0.02-0.1 mol/L, preferably 0.02 mol/L; a concentration of the ammonia solution is 5-10 mol/L, preferably 8 mol/L; and there is no specific concentration requirement for the dilute sulfuric acid.

The copper(II)-ammonia complex ion sulfidization activator can be applied to the sulfidization flotation process of copper oxide ore.

In a third aspect, the disclosure further provides a sulfidization flotation method for the copper oxide ore, comprising:

(1) introducing the copper(II)-ammonia complex ion sulfidization activator to a slurry of the copper oxide ore followed by mixing uniformly;

(2) adding a solution of a sulfidizing agent to perform sulfidization flotation.

In an embodiment, the sulfidization flotation method further comprises:

before step (1), mixing the copper oxide ore with a solvent to produce a slurry; and adjusting the pH of the slurry.

In an embodiment, adding a mixed collector and a foaming agent to the slurry obtained in step (2) followed by mixing uniformly; and subjecting the slurry to skimming to obtain concentrate and tailings.

In an embodiment, a copper content in the copper oxide ore is 40-55%.

In an embodiment, a mass ratio of the copper oxide ore to the solvent is 2:35.

In an embodiment, the solvent is water, preferably deionized water.

In an embodiment, the slurry is adjusted to pH 6-8.

In an embodiment, an addition amount of the copper(II)-ammonia complex ion sulfidization activator is 0.5-3 mL per gram of the copper oxide ore.

In an embodiment, the sulfidizing agent is selected from the group consisting of sodium sulfide, sodium hydrosulfide, hydrogen sulfide and a combination thereof. The concentration of the sulfidizing agent solution is 0.2 mol/L, and the addition amount of the sulfidizing agent solution is 0.2-1.0 mL per gram of copper oxide ore.

In an embodiment, the sulfidizing agent is sodium sulfide due to good sulfidization effect, wide source, low cost and high economic benefit.

In an embodiment, a concentration of the mixed collector is $8 \times 10^{-4}$ mol/L and the addition amount of the mixed collector is 0.6-1.5 mL per gram of copper oxide ore.

In an embodiment, the mixed collector is a mixture of benzohydroxamic acid and xanthate; a molar ratio of benzohydroxamic acid to the xanthate is 1:3. The mixed collector of benzohydroxamic acid and xanthate has a synergistic collection effect on the copper oxide ore, where the benzohydroxamic acid is used as a chelating agent to chelate with the active site of the non-sulfidization area on the surface of the mineral to form a five-membered ring; and the xanthate acts on the sulfidization area.

In an embodiment, the xanthate is butyl xanthate, amyl xanthate or a combination thereof.

In an embodiment, the xanthate is a mixture of butyl xanthate and amyl xanthate in a molar ratio of 1:1.

In an embodiment, the foaming agent is terpineol oil; an addition amount of the foaming agent is 0.5-1 μL, preferably 0.5 μL, per gram of the copper oxide ore.

In an embodiment, the step (2) further includes: calculating a recovery rate of the copper oxide ore.

The action mechanism of the copper(II)-ammonia complex ion sulfidization activator in the sulfidization flotation for a copper oxide slurry is further illustrated as follows.

The copper(II)-ammonia complex ion sulfidization activator, after added to the ore slurry to be floated, is adsorbed on the surface of copper oxide minerals, which causes the sulfur ions in the sulfidizing agent to be quickly adsorbed on the mineral surface, accelerating the sulfidization process and avoiding the inhibitory effect of residual sulfur ions in the slurry. At the same time, the adsorption of the copper (II)-ammonia complex ions leads to the presence of more active sites on the surface of the mineral, improving the adsorption amount of the collecting agent on the surface and thus achieving the strengthening effect. Moreover, the copper(II)-ammonia complex ions can also absorb the sulfur ions and hydrosulfide ions that remain on the mineral surface to eliminate the inhibitory effect caused by excessive sulfur ions, avoiding the oversulfidization. The copper(II)-ammonia complex ions adsorbed on the surface of the copper oxide mineral have a complexing effect on the copper atoms on the mineral surface, which can lead to the selective dissolution of the mineral surface to reveal a fresh surface to provide an active site for xanthogenate (xanthate), or can cause lattice defects on the mineral surface to improve the porosity, enhancing the adsorption of the collector on the mineral surface.

The beneficial effects of the disclosure are illustrated as follows.

(1) Compared with the existing activators (such as ammonium sulfate, and ammonium bicarbonate) for strengthening the sulfidization flotation of copper oxide ores, the new copper(II)-ammonia complex ion sulfidization activator provided herein can obtain a better flotation effect. Specifically, the recovery rate is increased by 10% compared to ammonium sulfate, and compared to the case where the activator is absent, the recovery rate is increased by nearly 20%.

(2) The copper(II)-ammonia complex ion sulfidization activator increases the stability of the sulfidization film and enhances the sulfidization efficiency, thereby greatly reducing the amount of sulfidizing agent. The combination of the copper(II)-ammonia ion (as a sulfidization activator) and a mixture of benzohydroxamic acid and xanthate (as a collector) can reduce the consumption of the collector, lowering the cost. Moreover, the mixed collector enables the non-sulfidization area to be still used for adsorption, greatly improving the recovery rate.

BRIEF DESCRIPTION OF THE DRAWINGS

The FIGURE is a flow chart of the flotation of copper oxide ore using a copper(II)-ammonia complex ion sulfidization activator of the disclosure.

DETAILED DESCRIPTION OF EMBODIMENTS

In order to clearly describe the technical problems to be solved, the technical solutions and the beneficial effects, the disclosure will be further illustrated with reference to the embodiments. It should be noted that these embodiments are merely illustrative of the disclosure, and are not intended to limit the disclosure.

Unless otherwise specified, the experiments in the following embodiments are performed using the well-known techniques and conditions in the art, or performed as instructed by the manufacturer. Unless otherwise specified, the reagents and instruments adopted below are all commercially available.

Example 1 Preparation of Copper(II)-Ammonia Complex Ion Sulfidization Activator

The preparation process of the copper(II)-ammonia complex ion sulfidization activator was specifically described as follows.

(1) A 0.02 mol/L copper sulfate solution and a 8 mol/L ammonia solution were prepared.

(2) The ammonia solution was slowly dropwise added to 10 mL of the copper sulfate solution at a rate of 1 drop/s to a final ammonia concentration of 0.04 mol/L. Then the reaction mixture was adjusted to pH 6.3 with dilute sulfuric acid, and thus the copper(II)-ammonia complex ion sulfidization activator, in which a molar ratio of $NH_3$ to $Cu^{2+}$ was 2:1, was produced.

Example 2 Impact of the Copper(II)-Ammonia Complex Ion Sulfidization Activator on Recovery Rate of Concentrate The flotation experiment was carried out the following conditions: a cell-type flotation machine (laboratory flotation machine); a volume of the flotation cell: 40 mL; a rotation speed: 1450 r/min; and flotation temperature: room temperature. 2.0 g of malachite and 35 mL of deionized water were poured into the flotation cell and mixed for 1 min to produce a slurry, which was adjusted to pH 7. A comparative experiment was designed, where 1 mL of the copper(II)-ammonia complex ion sulfidization activator prepared in Example 1 was applied in the experimental group, and 1 mL of deionized water was added in the control group. The reaction was performed for 2 min, and then 0.4 mL of sodium sulfide (0.2 mol/L) was added to perform sulfidization for 3 min; a mixed collector of 0.4 mL of butyl xanthate (0.06 mol/L) and 0.4 mL of benzohydroxamic acid (0.02 mol/L) was added to perform collection for 3 min; and then 1 μL of terpineol oil was added to perform foaming reaction for 1 min. The two groups were respectively subjected to manual skimming for 4 min to obtain a foam product, and then the products were respectively dried in an oven at 50° C. to produce a concentrate. The concentrate was weighed and the recovery rate was calculated, and the results were shown in Table 1.

TABLE 1

Comparison of recovery rates between the experimental and control groups

| Group | Experimental group | Control group |
|---|---|---|
| Recovery rate of concentrate (%) | 92.4 | 73.8 |

The results showed that compared to the deionized water, the copper(II)-ammonia complex ion sulfidization activator containing $NH_3$ and $Cu^{2+}$ in a molar ratio of 2:1 increased the recovery rate by nearly 20% and significantly strengthened the sulfidization effect.

Example 3 Effect of Molar Ratio of Copper Ion to Ammonia in the Copper(II)-Ammonia Complex Ion Sulfidization Activator on the Recovery Rate of Concentrate (1) Preparation of Copper(II)-Ammonia Complex Ion Sulfidization Activators with Different Molar Ratios of $NH_3$ to $Cu^{2+}$ Three copper sulfate solutions with different concentrations (each for 10 mL) were dropwise added with a 8 mol/L concentrated ammonia water respectively to pH 6.3, 6.7 and 7.2 to accordingly produce the copper(II)-ammonia complex ion solutions respectively with a $NH_3$—$Cu^{2+}$ molar ratio of 2:1, 3:1 and 4:1. These copper(II)-ammonia complex ion solutions can also be prepared according to the molar ratio of $NH_3$ to $Cu^{2+}$ (2) Flotation Experiment The flotation experiment was carried out under the following conditions: a cell-type flotation machine; a volume of the flotation cell: 40 mL; a rotation speed: 1450 r/min; and flotation temperature: room temperature. 2.0 g of malachite and 35 mL of deionized water were poured into the flotation cell and mixed for 1 min to produce a slurry, which was adjusted to pH 7. A comparative experiment, in which four groups were designed, was carried out, where 1 mL of a copper(II)-ammonia complex ion solution with a molar ratio of $NH_3$ to $Cu^{2+}$ of 2:1 was used as the sulfidization activator in the experimental group; copper(II)-ammonia complex ion solutions with a molar ratio of $NH_3$ to $Cu^{2+}$ of 4:1, 3:1 and 1:1 were respectively used in the control groups 1-3 at the same amount. The reaction was performed for 2 min, and then 0.4 mL of sodium sulfide (0.2 mol/L) was added to perform sulfidization for 3 min; a mixed collector consisting of 0.4 mL of butyl xanthate (0.06 mol/L) and 0.4 mL of benzohydroxamic acid (0.02 mol/L) was added to perform collection for 3 min; and then 1 μL of terpineol oil were added to perform foaming reaction for 1 min. After that, the four groups were subjected to manual skimming for 4 min to obtain a foam product, and the foam products were respectively dried in an oven at 50° C. to produce a concentrate. The concentrate was weighed and the recovery rate was calculated, and the results were shown in Table 2.

TABLE 2

Effect of molar ratio of $NH_3$ to $Cu^{2+}$ on recovery rate of concentrate

| Group | Experimental group (2:1) | Control group 1 (4:1) | Control group 2 (3:1) | Control group 3 (1:1) |
|---|---|---|---|---|
| Recovery rate of concentrate (%) | 93.1 | 75.9 | 82.7 | 70.4 |

It can be concluded from Table 2 that among the four copper(II)-ammonia complex ion solutions differing in molar ratio of $NH_3$ to $Cu^{2+}$, the copper(II)-ammonia complex ion solution with a molar ratio of $NH_3$ to $Cu^{2-}$ of 2:1 allowed for the highest recovery rate (93.1%), which was about 18% higher than the recovery rate obtained in the use of the solution with a molar ratio of $NH_3$ to $Cu^{2+}$ of 4:1 and 10% higher than the recovery rate obtained in the use of the solution with a molar ratio of $NH_3$ to $Cu^{2+}$ of 3:1. In the case of the molar ratio of $NH_3$ to $Cu^{2+}$ of 1:1, the copper(II)-ammonia complex ion solution even showed a negative effect on the recovery rate.

Example 4 Comparison Between the Copper(II)-Ammonia Complex Ion Sulfidization Activator Provided Herein and Commercially-Available Sulfidization Activators Flotation Experiment 2.0 g of malachite and 35 mL of deionized water were poured into the flotation cell and mixed for 1 min to produce a slurry, which was adjusted to pH 7. A comparative experiment, in which three groups were designed, was carried out, where 1 mL of the copper(II)-ammonia complex ion sulfidization activator prepared in Example 1 was added in the first group (a total concentration of the copper(II)-ammonia complex ions in the flotation system was $0.5 \times 10^{-3}$ mol/L); ammonium sulfate was added in the second group to an optimal concentration of $5 \times 10^{-3}$ mol/L; and diethylamine phosphate was added in the third group to an optimal final concentration of $4 \times 10^{-3}$ mol/L. The activation was performed for 2 min, and then 0.4 mL of sodium sulfide (0.2 mol/L) was added to perform sulfidization for 3 min; 0.8 mL of a mixed collector (consisting of 0.4 mL of butyl xanthate with a concentration of 0.06 mol/L and 0.4 mL of benzohydroxamic acid with a concentration of 0.02 mol/L) was added to perform collection for 3 min; and then 1 μL of terpineol oil was added to perform foaming reaction for 1 min. After that, the three groups were subjected to skimming for 4 min to produce a foam product, and the foam products were respectively dried in an oven at 50° C. to produce a concentrate. The concentrate was weighed and the recovery rate was calculated, and the results were shown in Table 3.

TABLE 3

Comparison of the copper(II)-ammonia complex ion sulfidization activator prepared herein and commercially-available sulfidization activators in the recovery rate

| Sulfidization activator | Copper(II)-ammonia complex ion | Ammonium sulfate | Diethylamine phosphate |
|---|---|---|---|
| Recovery rate of concentrate (%) | 92.8 | 80.2 | 75.6 |

It can be seen from Table 3 that the copper(II)-ammonia complex ion sulfidization activator provided herein (92.8%) was 10-20% higher than the existing sulfidization activators (diethylamine phosphate (75.6%); ammonium sulfate (80.2)) in the flotation recovery rate, which indicated that the sulfidization activator provided herein can significantly improve the flotation effect. Moreover, the addition amount of the sulfidization activator was also effectively reduced.

Example 5 Comparison Between the Copper(II)-Ammonia Complex Ion and Single Use of Copper Ion or Ammonium Ion Flotation Experiment 2.0 g of malachite and 35 mL of deionized water were poured into the flotation cell and mixed for 1 min to produce a slurry, which was adjusted to pH 7. A comparative experiment, in which four groups were designed, was carried out, where 1 mL of deionized water was added in group 1; 1 mL of the copper(II)-ammonia complex ion sulfidization activator prepared in Example 1 was added in group 2 (a concentration of the complex ions in the ore slurry was $0.5 \times 10^{-3}$ mol/L); a copper sulfate solution was added into group 3 to a final $Cu^{2+}$ concentration of $0.5 \times 10^{-3}$ mol/L; and an sulfate solution was added in group 4 to a final ammonium ion concentration of $1 \times 10^{-3}$ mol/L. The activation was carried out for 2 min, and then 0.4 mL of sodium sulfide (0.2 mol/L) was added to perform sulfidization for 3 min; 0.8 mL of a mixed collector (consisting of 0.4 mL of butyl xanthate with a concentration of 0.06 mol/L and 0.4 mL of benzohydroxamic acid with a concentration of 0.02 mol/L) was added to perform collection for 3 min; and then 1 μL of terpineol oil was added to perform foaming reaction for 1 min. After that, the four groups were subjected to skimming for 4 min to produce a foam product, and the foam products were respectively dried in an oven at 50° C. to produce a concentrate. The concentrate was weighed and the recovery rate was calculated, and the results were shown in Table 4.

TABLE 4

Recovery rates of the four groups

| Group | Deionized water | Copper(II)-ammonia complex ion sulfidization activator | Cupric ion | Ammonium ion |
|---|---|---|---|---|
| Recovery rate of concentrate (%) | 72.4 | 93.0 | 66.4 | 76.3 |

The results showed that compared to deionized water, the copper(I)-ammonia complex ion sulfidization activator ($0.5 \times 10^{-3}$ mol/L) provided herein improved the recovery rate of copper oxide by about 20%. When cupric ion ($0.5 \times 10^{-3}$ mol/L) was used as activator alone, the recovery rate of copper oxide was even lower than the blank group (i.e., the deionized water group), indicating that the single use of copper ion showed a negative effect on the flotation effect. Though the single addition of ammonium ion ($1 \times 10^{-3}$ mol/L) can improve the recovery rate of copper oxide to a certain extent, the effect was significantly inferior to that obtained in the use of the copper(II)-ammonia complex ion. The experimental results clearly demonstrated that the copper(II)-ammonia activator provided herein had a significant synergistic effect compared to the single use of copper ion or ammonium ion, and the synergistic effect not only enhanced the flotation effect, but also decreased the consumption of the activator.

Described above are merely preferred embodiments of the disclosure, which are not intended to limit the disclosure. It should be noted that any modifications and improvements made by those skilled in the art without departing from the spirit of the disclosure shall fall within the scope of the disclosure defined by the appended claims.

What is claimed is:

1. A method of preparing a copper(II)-ammonia complex ion sulfidization activator, the method comprising:
    dropwise adding an ammonia solution into a copper salt solution to produce a mixture; and
    adjusting the mixture to pH 6-7.2 with dilute sulfuric acid to produce the copper(II)-ammonia complex ion sulfidization activator, wherein a molar ratio of $NH_3$ to $Cu^{2+}$ in an active ingredient of the copper(II)-ammonia complex ion sulfidization activator is 2-4:1.

2. The method of claim 1, wherein the copper salt solution is selected from the group consisting of copper sulfate solution, copper chloride solution, copper nitrate solution and a combination thereof; and the ammonia solution is selected from the group consisting of ammonium sulfate solution, ammonium chloride solution, ammonium nitrate solution, ammonia water and a combination thereof.

3. The method of claim 1, wherein a concentration of the copper salt solution is 0.02 mol/L; and a concentration of the ammonia solution is 5-10 mol/L.

4. The method of claim 1, wherein the ammonia solution is dropwise added to the copper salt solution at a rate of 0.5-2 drops/second.

5. A sulfidization flotation method for a copper oxide ore, comprising:
    a) dropwise adding an ammonia solution into a copper salt solution to produce a mixture;
    b) adjusting the mixture in step a) to pH 6-7.2 with dilute sulfuric acid to produce the copper(II)-ammonia complex ion sulfidization activator, wherein a molar ratio of $NH_3$ to $Cu^{2+}$ in an active ingredient of the copper(II)-ammonia complex ion sulfidization activator is 2-4:1;

c) introducing the copper(II)-ammonia complex ion sulfidization activator to a slurry of the copper oxide ore followed by mixing uniformly to produce a mixture; and d) adding a sulfidizing agent solution to the mixture in step c) to perform sulfidization flotation to obtain a slurry; adding a mixed collector and a foaming agent to the slurry obtained in step d) followed by mixing uniformly and skimming to obtain concentrate and tailings.

6. The sulfidization flotation method of claim 5, wherein the sulfidizing agent solution is selected from the group consisting of sodium sulfide solution, sodium hydrosulfide solution, hydrogen sulfide solution and a combination thereof; and an addition amount of the sulfidizing agent solution is 0.2-1.0 mL per gram of the copper oxide ore.

7. The sulfidization flotation method of claim 5, wherein a concentration of the mixed collector is $8 \times 10^{-4}$ mol/L and an addition amount of the mixed collector is 0.6-1.5 mL per gram of the copper oxide ore; and the mixed collector is a mixture of benzohydroxamic acid and xanthate.

8. The sulfidization flotation method of claim 7, wherein the mixed collector is a mixture of benzohydroxamic acid and xanthate in a molar ratio of 1:3.

9. The sulfidization flotation method of claim 7, wherein the xanthate is butyl xanthate, amyl xanthate or a combination thereof.

10. The sulfidization flotation method of claim 8, wherein the xanthate is butyl xanthate, amyl xanthate or a combination thereof.

11. The sulfidization flotation method of claim 5, wherein a copper content in the copper oxide ore is 40-55%.

12. The sulfidization flotation method of claim 5, wherein an addition amount of the copper(II)-ammonia complex ion sulfidization activator is 0.5-3 mL per gram of the copper oxide ore.

13. The sulfidization flotation method of claim 5, wherein a concentration of the sulfidizing agent solution is 0.2 mol/L.

14. The sulfidization flotation method of claim 5, wherein the foaming agent is terpineol oil; and an addition amount of the foaming agent is 0.5-1 µL per gram of the copper oxide ore.

\* \* \* \* \*